(12) United States Patent
Fong

(10) Patent No.: US 7,567,247 B2
(45) Date of Patent: Jul. 28, 2009

(54) METHOD AND SYSTEM FOR DISJOINT AND SMOOTH INTERPOLATION OF SCALAR FIELD ON SUBDIVISION SURFACE

(75) Inventor: Julian Fong, Seattle, WA (US)

(73) Assignee: Pixar, Emeryville, CA (US)

( * ) Notice: Subject to any disclaimer, the term of this patent is extended or adjusted under 35 U.S.C. 154(b) by 158 days.

(21) Appl. No.: 11/061,089

(22) Filed: Feb. 18, 2005

(65) Prior Publication Data

US 2005/0212804 A1 Sep. 29, 2005

Related U.S. Application Data

(60) Provisional application No. 60/547,566, filed on Feb. 24, 2004.

(51) Int. Cl.
*G06T 17/20* (2006.01)
*G06T 17/00* (2006.01)

(52) U.S. Cl. ............... 345/423; 345/419; 345/420

(58) Field of Classification Search .......... None
See application file for complete search history.

(56) References Cited

U.S. PATENT DOCUMENTS

| | | | | |
|---|---|---|---|---|
| 5,929,860 A | * | 7/1999 | Hoppe | 345/419 |
| 5,963,209 A | * | 10/1999 | Hoppe | 345/419 |
| 6,075,540 A | * | 6/2000 | Hoppe | 345/419 |
| 6,300,960 B1 | * | 10/2001 | DeRose et al. | 345/474 |
| 6,806,874 B2 | * | 10/2004 | Biermann et al. | 345/420 |
| 7,098,916 B1 | * | 8/2006 | Khodakovsky et al. | 345/428 |

OTHER PUBLICATIONS

Derose et al., "Subdivision Surfaces in Character Animation," Proc. SIGGRAPH 1998, 10 pages.

* cited by examiner

*Primary Examiner*—Xiao M Wu
*Assistant Examiner*—Daniel F Hajnik
(74) *Attorney, Agent, or Firm*—Townsend and Townsend and Crew LLP

(57) ABSTRACT

Method and system for determining a scalar field on a subdivision surface. The method includes providing a surface mesh including an edge. The edge connects a plurality of vertices, and is adjacent to a plurality of faces. The plurality of vertices correspond to a plurality of values for a scalar field. Additionally, the method includes processing information associated with the surface mesh, and determining a geometric location for an edge point on a subdivision surface. The edge point corresponds to the edge. Moreover, the method includes determining whether the edge is a face-varying boundary, processing information associated with whether the edge is a face-varying boundary, and determining a first value for the scalar field corresponding to the edge point based on at least information associated with whether the edge is a face-varying boundary.

24 Claims, 8 Drawing Sheets

METHOD AND SYSTEM FOR DISJOINT AND SMOOTH INTERPOLATION OF SCALAR FIELD ON SUBDIVISION SURFACE

CROSS-REFERENCES TO RELATED APPLICATIONS

This application claims priority to U.S. Provisional Patent Application No. 60/547,566, filed Feb. 24, 2004, commonly assigned, incorporated by reference herein for all purposes.

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK

NOT APPLICABLE

BACKGROUND OF THE INVENTION

The present invention relates in general to computer animation techniques. More particularly, the invention provides a method and system for interpolation of scalar fields on subdivision surfaces. Merely by way of example, the invention is described as it applies to a rendering process, but it should be recognized that the invention has a broader range of applicability.

Throughout the years, movie makers have often tried to tell stories involving make-believe creatures, far away places, and fantastic things. To do so, they have often relied on animation techniques to bring the make-believe to "life." Two of the major paths in animation have traditionally included drawing-based animation techniques and stop motion animation techniques.

Drawing-based animation techniques were refined in the twentieth century, by movie makers such as Walt Disney and used in movies such as "Snow White and the Seven Dwarfs" (1937) and "Fantasia" (1940). This animation technique typically required artists to hand-draw or paint animated images onto transparent media or cels. After painting, each cel would then be captured or recorded onto film as one or more frames in a movie.

Stop motion-based animation techniques typically required the construction of miniature sets, props, and characters. The filmmakers would construct the sets, add props, and position the miniature characters in a pose. After the animator was happy with how everything was arranged, one or more frames of film would be taken of that specific arrangement. Stop motion animation techniques were developed by movie makers such as Willis O'Brien for movies such as "King Kong" (1933). Subsequently, these techniques were refined by animators such as Ray Harryhausen for movies including "Mighty Joe Young" (1948) and "Clash Of The Titans" (1981).

With the wide-spread availability of computers in the later part of the twentieth century, animators began to rely upon computers to assist in the animation process. This included using computers to facilitate drawing-based animation, for example, by painting images, by generating in-between images ("tweening"), and the like. This also included using computers to augment stop motion animation techniques. For example, physical models could be represented by virtual models in computer memory, and manipulated.

One of the pioneering companies in the computer graphics (CG) industry was Pixar. Pixar developed both computing platforms specially designed for CG, and rendering software now known as RenderMan®. RenderMan® was particularly well received in the CG industry and recognized with two Academy Awards®. RenderMan® software is used to convert graphical specifications of objects and convert them into one or more images. This technique is known generally in the industry as rendering.

A rendering process often uses geometric primitives to represent objects subject to projection onto an image plane. For example, the geometric primitives include subdivision surfaces. The geometric primitives are often mapped with textures and projected onto the image plane if they are visible to the viewer. For example, the texture mapping uses a texture image. The texture image includes a texture value as a function of coordinates in the texture space. The two-dimensional coordinates in the texture space are mapped with three-dimensional coordinates in the object space, which also correspond to two-dimensional coordinates on the image screen.

For example, the three-dimensional coordinates represent a vertex on a subdivision surface. The mapping between the subdivision surface and the texture image may be obtained by subdividing the texture coordinates in the same way as subdividing the object coordinates. For example, each vertex of a surface mesh is represented by object coordinates (x, y, z) corresponding to texture coordinates (s, t). The vertex may be treated as (x, y, z, s, t) so that the texture coordinates (s, t) are subdivided in the same way as the object coordinates (x, y, z). But this conventional technique often assumes that the scalar fields s and t are smooth over the entire surface.

If the scalar field s or t is not smooth over the surface, the surface mesh can be divided into several disjoint sub-meshes. For Catmull-Clark subdivision, these sub-meshes should overlap by at least one face in order to preserve continuity of other scalar fields. Such subdivision is very complicated for surface mesh with difficult topology. Alternatively, each vertex of the surface mesh can have different values for s or t if the vertex is shared by at least two faces. For example, on different faces, the vertex is associated with different s or t values. If the surface mesh is subdivided, the vertices on the subdivision surface can be calculated by bilinear interpolation of the scalar field across each face in the surface mesh. This conventional technique can preserve the desired discontinuities in the scalar field. But the bilinear interpolation is different from the subdivision interpolation for the geometry representation of (x, y, z) such as near extraordinary vertices in the subdivision mesh. For Catmull-Clark subdivision, the extraordinary vertices each have a valence other than four. These differences between bilinear and subdivision interpolation often results in "kinks" on the textured subdivision surface.

Other conventional techniques use 3D paint to project a texture onto a subdivision surface. These techniques often are difficult and complicated. For example, the 3D paint techniques may require a particular workflow aided by specialized painting packages.

Hence it is highly desirable to improve techniques for texturing on subdivision surfaces.

BRIEF SUMMARY OF THE INVENTION

The present invention relates in general to computer animation techniques. More particularly, the invention provides a method and system for interpolation of scalar fields on subdivision surfaces. Merely by way of example, the invention is described as it applies to a rendering process, but it should be recognized that the invention has a broader range of applicability.

According to one embodiment of the present invention, a method for determining a scalar field on a subdivision surface includes providing a surface mesh including an edge. The edge connects a plurality of vertices, and is adjacent to a plurality of faces. The plurality of vertices correspond to a plurality of values for a scalar field. Additionally, the method includes processing information associated with the surface mesh, and determining a geometric location for an edge point on a subdivision surface based on at least information associated with the surface mesh. The edge point corresponds to the edge. Moreover, the method includes determining whether the edge is a face-varying boundary based on at least information associated with the surface mesh, processing information associated with whether the edge is a face-varying boundary, and determining a first value for the scalar field corresponding to the edge point based on at least information associated with whether the edge is a face-varying boundary.

According to another embodiment, a method for determining a scalar field on a subdivision surface includes providing a surface mesh including a first vertex connected to a plurality of vertices by a plurality of edges. The first vertex is adjacent to a plurality of faces and corresponds to a first value for a scalar field. Additionally, the method includes processing information associated with the surface mesh, and determining a geometric location for a vertex point on a subdivision surface based on at least information associated with the surface mesh. The vertex point corresponds to the first vertex. Moreover, the method includes determining a face-varying mask for the first vertex based on at least information associated with the surface mesh, processing information associated with the face-varying mask for the first vertex, and determining a second value for the scalar field corresponding to the vertex point based on at least in formation associated with the face-varying mask for the first vertex.

According to yet another embodiment, a computer program product includes a computer-readable medium including instructions for determining a scalar field on a subdivision surface. The computer-readable medium includes one or more instructions for providing a surface mesh including an edge. The edge connects a plurality of vertices and is adjacent to a plurality of faces. The plurality of vertices corresponds to a plurality of values for a scalar field. Additionally, the computer-readable medium includes one or more instructions for processing information associated with the surface mesh, and one or more instructions for determining a geometric location for an edge point on a subdivision surface based on at least information associated with the surface mesh. The edge point corresponds to the edge. Moreover, the computer-readable medium includes one or more instructions for determining whether the edge is a face-varying boundary based on at least information associated with the surface mesh, one or more instructions for processing information associated with whether the edge is a face-varying boundary, and one or more instructions for determining a first value for the scalar field corresponding to the edge point based on at least information associated with whether the edge is a face-varying boundary.

According to yet another embodiment, a computer program product includes a computer-readable medium including instructions for determining a scalar field on a subdivision surface. The computer-readable medium includes one or more instructions for providing a surface mesh including a first vertex connected to a plurality of vertices by a plurality of edges. The first vertex is adjacent to a plurality of faces and corresponds to a first value for a scalar field. Additionally, the computer-readable medium includes one or more instructions for processing information associated with the surface mesh, and one or more instructions for determining a geometric location for a vertex point on a subdivision surface based on at least information associated with the surface mesh. The vertex point corresponds to the first vertex. Moreover, the computer-readable medium includes one or more instructions for determining a face-varying mask for the first vertex based on at least information associated with the surface mesh, one or more instructions for processing information associated with the face-varying mask for the first vertex, and one or more instructions for determining a second value for the scalar field corresponding to the vertex point based on at least in formation associated with the face-varying mask for the first vertex.

According to yet another embodiment, a system for determining a scalar field on a subdivision surface includes a processing system. The processing system is configured to provide a surface mesh including an edge. The edge connects a plurality of vertices and is adjacent to a plurality of faces. The plurality of vertices corresponds to a plurality of values for a scalar field. Additionally, the processing system is configured to process information associated with the surface mesh, and determine a geometric location for an edge point on a subdivision surface based on at least information associated with the surface mesh. The edge point corresponds to the edge. Moreover, the processing system is configured to determine whether the edge is a face-varying boundary based on at least information associated with the surface mesh, process information associated with whether the edge is a face-varying boundary, and determine a first value for the scalar field corresponding to the edge point based on at least information associated with whether the edge is a face-varying boundary.

According to yet another embodiment, a system for determining a scalar field on a subdivision surface includes a processing system. The processing system is configured to provide a surface mesh including a first vertex connected to a plurality of vertices by a plurality of edges. The first vertex is adjacent to a plurality of faces and corresponds to a first value for a scalar field. Additionally, the processing system is configured to process information associated with the surface mesh, and determine a geometric location for a vertex point on a subdivision surface based on at least information associated with the surface mesh. The vertex point corresponds to the first vertex. Moreover, the processing system is configured to determine a face-varying mask for the first vertex based on at least information associated with the surface mesh, process information associated with the face-varying mask for the first vertex, and determine a second value for the scalar field corresponding to the vertex point based on at least in formation associated with the face-varying mask for the first vertex.

Many benefits are achieved by way of the present invention over conventional techniques. Some embodiments of the present invention provide interpolations of a disjoint and smooth scalar field on subdivision surfaces. For example, the interpolations can preserve desired discontinuities and continuities for the scalar field. Certain embodiments of the present invention perform edge and vertex classifications for each scalar field. Based on classifications, interpolations of the scalar field can performed under various rules. Some embodiments of the present invention analyze and interpolate each scalar field independently. Desired discontinuities for the scalar field can be preserved without affecting other scalar fields on the subdivision surfaces. For example, creases and corners can be specified by the user for a scalar field without affecting other scalar fields or the geometry. Certain embodiments of the present invention can provide desired smooth interpolations and eliminate or reduce "kinks" near extraordinary vertices. Some embodiments of the present invention use hybrid interpolations of a scalar field.

Various additional objects, features and advantages of the present invention can be more fully appreciated with reference to the detailed description and accompanying drawings that follow.

DETAILED DESCRIPTION OF THE INVENTION

The present invention relates in general to computer animation techniques. More particularly, the invention provides a method and system for interpolation of scalar fields on subdivision surfaces. Merely by way of example, the invention is described as it applies to a rendering process, but it should be recognized that the invention has a broader range of applicability.

Figure 1:
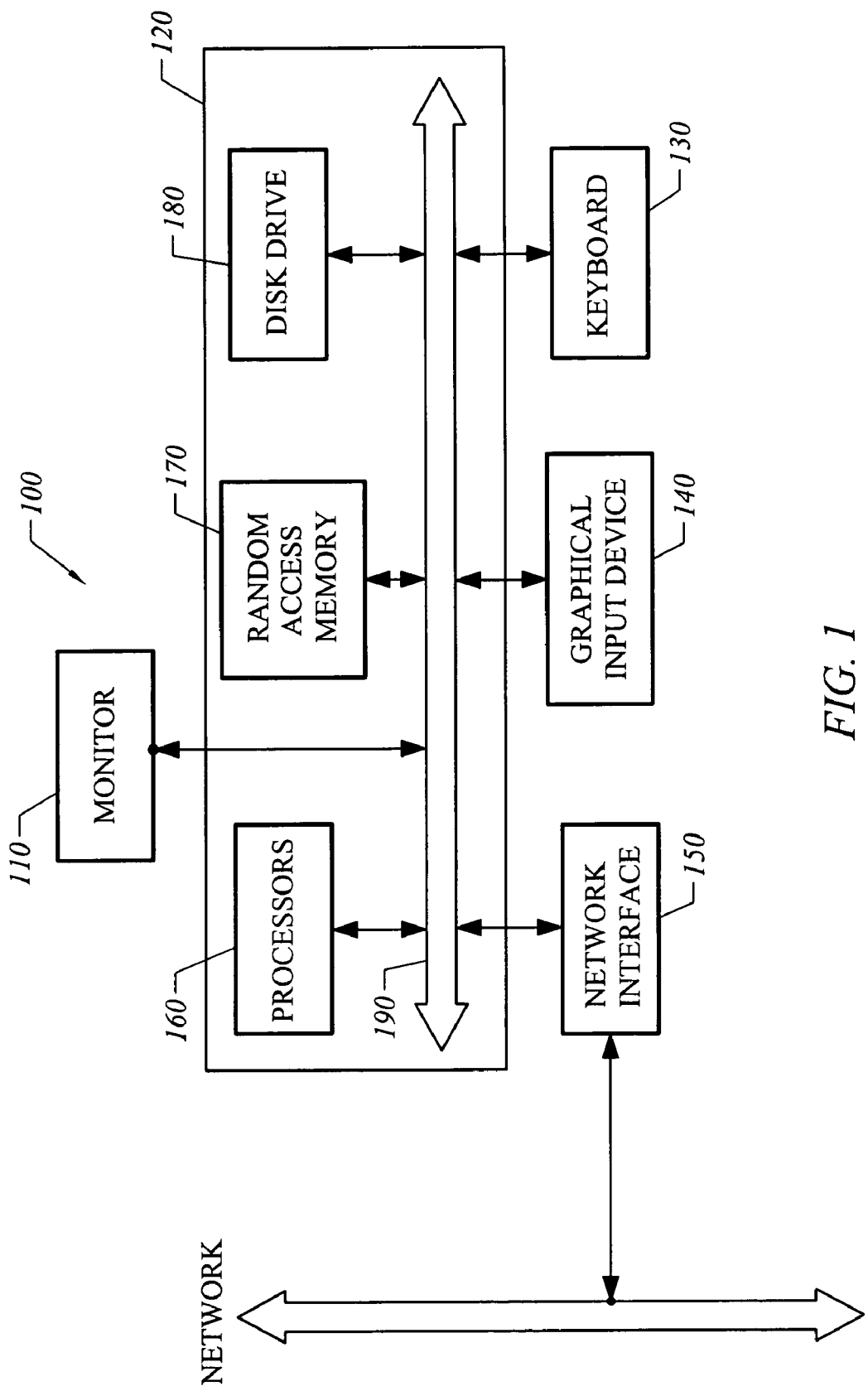
FIG. 1 illustrates a block diagram of a rendering system according to one embodiment of the present invention.

FIG. 1 is a simplified computer rendering system according to an embodiment of the present invention. This diagram is merely an example, which should not unduly limit the scope of the claims. One of ordinary skill in the art would recognize many variations, alternatives, and modifications. The computer system 100 includes a monitor 110, a computer 120, a keyboard 130, a user input device 140, a network interface 150.

The user input device 140 is embodied as a computer mouse, a trackball, a track pad, wireless remote, and the like. The user input device 140 allows a user to select objects, icons, text and the like that appear on the monitor 110.

The network interface 150 includes one or more of an Ethernet card, a modem (telephone, satellite, cable, ISDN), (asynchronous) digital subscriber line (DSL) unit, and the like. The network interface 150 is usually coupled to a computer network as shown. In other embodiments, the network interface 150 may be physically integrated on the motherboard of the computer 120, may be a software program, such as soft DSL, or the like.

The computer 120 includes computer components such as a processor 160, and memory storage devices, such as a random access memory (RAM) 170, a disk drive 180, and a system bus 190 interconnecting the above components. In another embodiment, the computer 120 is a PC compatible computer having multiple microprocessors such as Xeon™ microprocessor from Intel Corporation. The computer 120 usually includes an operating system such as UNIX.

The RAM 170 and the disk drive 180 are examples of tangible media for storage of data, audio/video files, computer programs, embodiments of the herein described invention including scene descriptors, object data files, shader descriptors, a rendering engine, output image files, texture maps, displacement maps, object pose data files, and the like. Other types of tangible media include floppy disks, removable hard disks, optical storage media such as CD-ROMs, semiconductor memories such as flash memories, read-only-memories (ROMs), battery-backed volatile memories, networked storage devices, and the like.

The computer system 100 may also include software that enables communications over a network such as the HTTP, TCP/IP, RTP/RTSP protocols, and the like. In alternative embodiments of the present invention, other communications software and transfer protocols may also be used, for example IPX, UDP or the like.

As discussed above and further emphasized here, FIG. 1 is representative of computer systems capable of embodying the present invention. It will be readily apparent to one of ordinary skill in the art that many other hardware and software configurations are suitable for use with the present invention. For example, the use of other micro processors are contemplated, such as Pentium™ or Itanium™ microprocessors; Opteron™ or AthlonXP™ microprocessors from Advanced Micro Devices, Inc; PowerPC G3™ or G4™ microprocessors from Motorola, Inc.; and the like. Further, other types of operating systems are contemplated, such as Windows® operating system such as WindowsXP®, WindowsNT®, or the like from Microsoft Corporation, Solaris from Sun Microsystems, LINUX, UNIX, MAC OS from Apple Computer Corporation, and the like. In yet another example, the present invention can be embodied with dedicated graphics processing units (GPUs) or special-purpose ray tracing hardware implemented with very large scale integrated (VLSI) chips or application-specific integrated circuits (ASICs).

Figure 2:
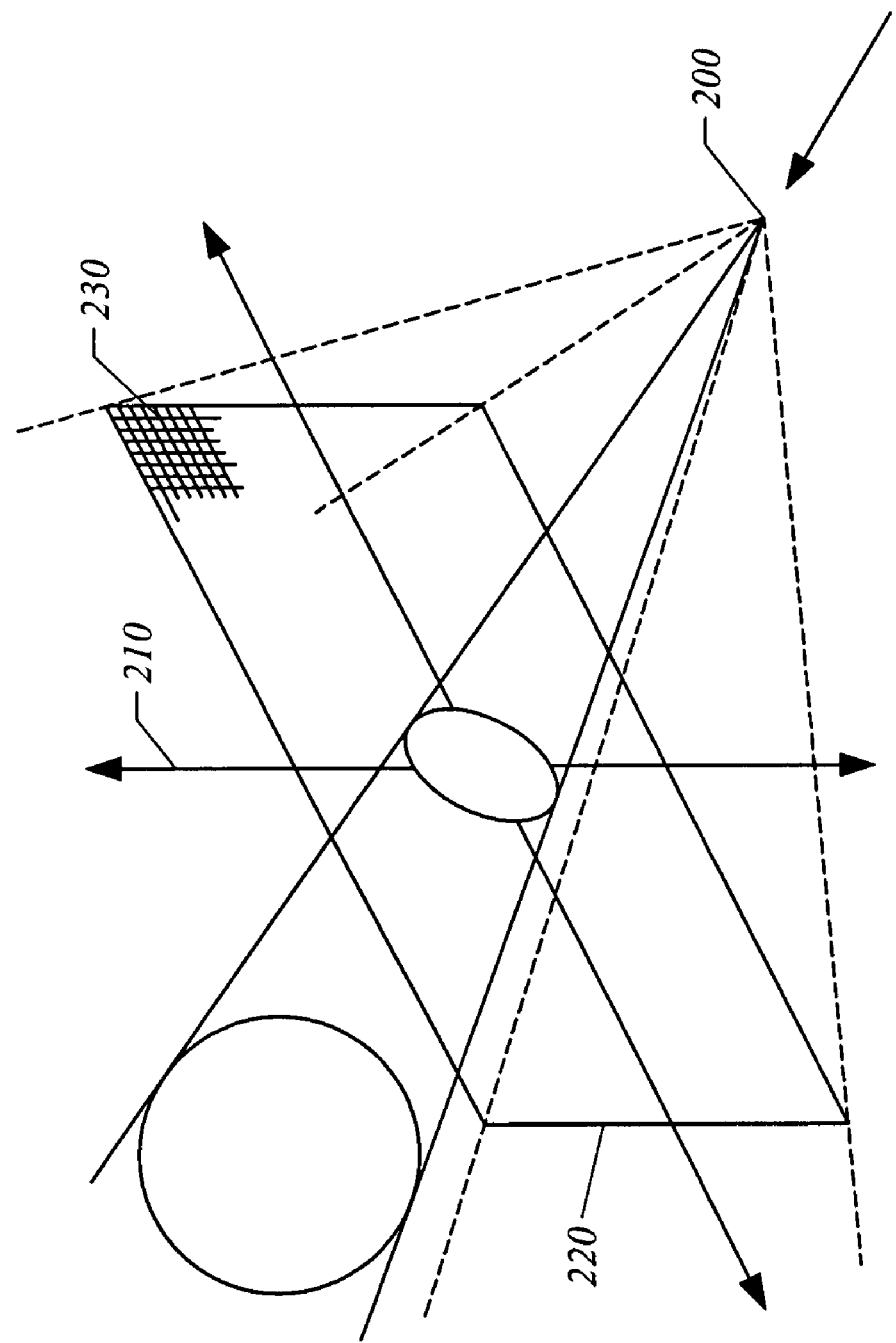
FIG. 2 is a diagram illustrating terms used in the present application.

FIG. 2 is a diagram illustrating terms used in the present application. In particular, as illustrated, a virtual camera 200 is defined for each image. Virtual camera 200 is associated with an image plane 210, which defines the two dimensional plane where the image will be recorded to. From image plane 210, a screen window 220 is defined that defines the outer bounds of the image to be rendered. Pixel locations 230 are then defined within screen window 220. The screen window 220 can be subdivided into a series of buckets, each of which may include a plurality of pixels. In one embodiment of the present invention, the screen window 220 has a pixel resolution of 2000 horizontal pixels and 1000 vertical pixels. In other embodiments of the present invention, a higher or lower pixel resolution in the horizontal or vertical direction is envisioned.

Figure 3:
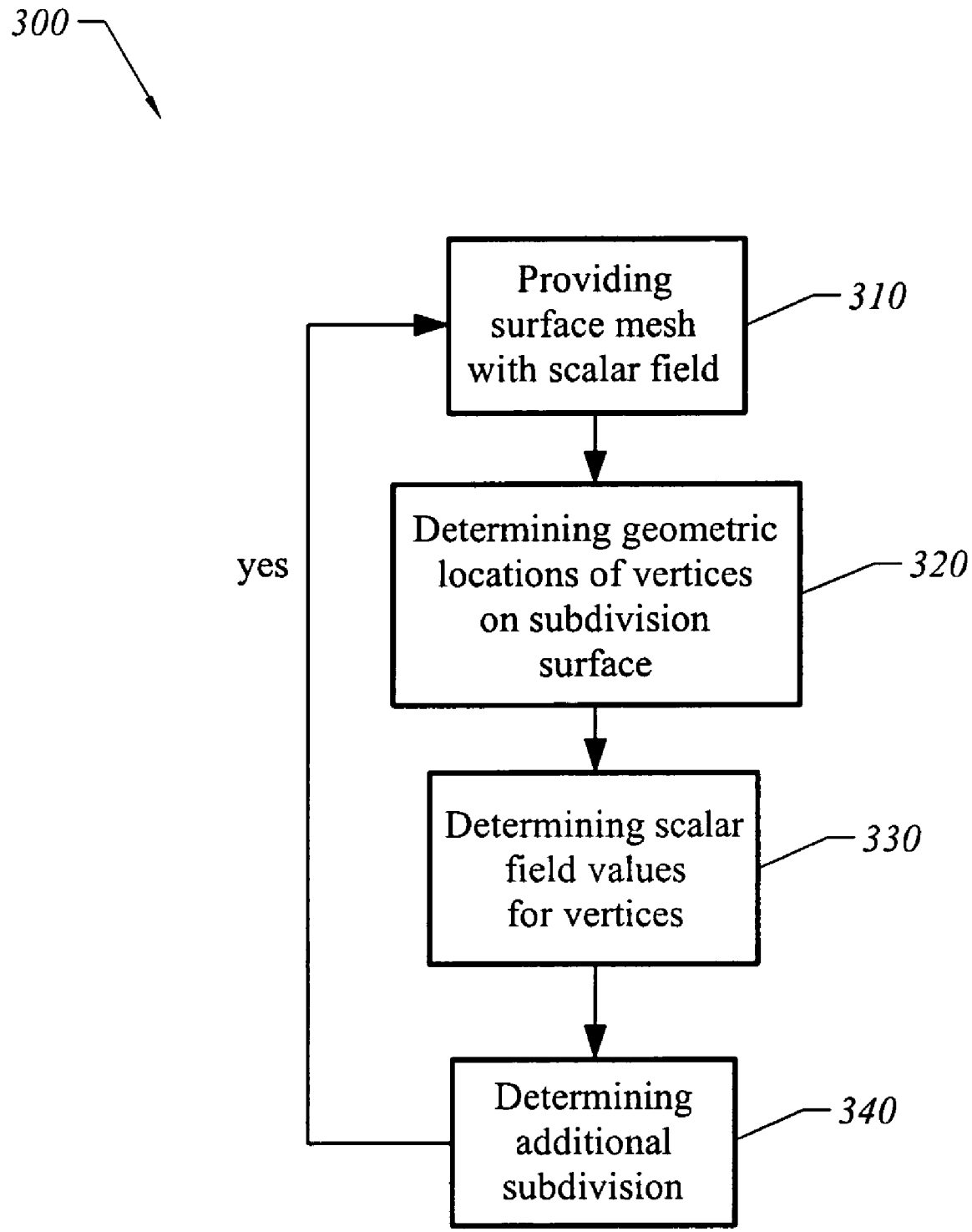
FIG. 3 is a simplified interpolation method for scalar field on subdivision surface according to an embodiment of the present invention.

FIG. 3 is a simplified interpolation method for scalar field on subdivision surface according to an embodiment of the present invention. This diagram is merely an example, which should not unduly limit the scope of the claims. One of ordinary skill in the art would recognize many variations, alternatives, and modifications. The interpolation method 300 includes a process 310 for providing surface mesh with scalar field, a process 320 for determining geometric locations of vertices on subdivision surface, a process 330 for determining scalar field values for vertices, and a process 340 for determining additional subdivision. Although the above has been shown using a selected sequence of processes, there can be many alternatives, modifications, and variations. For example, some of the processes may be expanded and/or combined. Other processes may be inserted to those noted above. Depending upon the embodiment, the specific sequences of processes may be interchanged with others replaced. Further details of these processes are found throughout the present specification and more particularly below.

At the process 310, a surface mesh is provided with a scalar field. For example, the surface mesh includes a plurality of vertices. Each vertex has a geometric location in the object space. For example, the geometric location is represented by coordinates $(x_0, y_0, z_0)$ in a three-dimensional Cartesian coordinate system. The coordinate system includes three axes x, y, and z. The geometric location of each vertex corresponds to at least a value for the scalar field. For example, the scalar field is represented by $s(x, y, z)$ as a scalar function of x, y, and z. The coordinates $(x_0, y_0, z_0)$ correspond to at least $s_0$, which is the value of s at $(x_0, y_0, z_0)$.

In one embodiment, s represents a scalar function of any type. In another embodiment, s represents a coordinate for a texture image in the texture space. For example, the texture image is related to surface color, normal vector perturbation, specularity, transparency, and/or surface displacement. In another example, the texture image has another coordinate t in addition to s.

In yet another embodiment, the surface mesh is provided with more than one scalar fields. For example, the scalar fields represent scalar functions of any types. In another example, the scalar fields include two coordinates of a texture image in the texture space. In yet another example, the scalar fields include coordinates of multiple texture images.

At the process 320, geometric locations of vertices are determined on a subdivision surface. For example, the surface mesh provided at the process 310 is subdivided. The subdivision can generate new vertices, which also form new edges and new faces. For example, the new vertices include face points, edge points, and vertex points. In one embodiment, a face point results from the subdivision of a face, an edge point results from the subdivision of an edge, and a vertex point results from the subdivision of a vertex. In another embodiment, the Catmull-Clark subdivision rules are used. For example, the geometric location of a face point is equal to the average of the geometric locations for all the original points that determine a face on the surface mesh. The face corresponds to the face point. In another example, the geometric location for an edge point on the subdivision surface is equal to the average of the geometric locations for the original points determining an original edge and the geometric locations corresponding to certain face points on the subdivision surface. The face points correspond to the original faces adjacent to the original edge. The edge point corresponds to the original edge. In another example, the geometric location of a vertex point is equal to a weighted average of the geometric location of an original vertex on the surface mesh, the geometric locations for certain edge points, and the geometric locations for some face points. Each of the edge points corresponds to an original edge that is incident on the original vertex, and each of the face points corresponds to an original face that is adjacent to the original vertex. The vertex point corresponds to the original vertex. In another embodiment, the Loop subdivision rules are used. In yet another embodiment, another type of subdivision such as Doo-Sabin subdivision, Butterfly subdivision, Midedge subdivision, and Kobbelt subdivision is used.

At the process 330, the scalar field values are determined for vertices on the subdivision surface. For example, certain new vertices are generated during subdivision, and these new vertices correspond to some new scalar field values. In one embodiment, each new vertex has a geometric location represented by coordinates $(x_n, y_n, z_n)$. These coordinates correspond to at least a value of the scalar field. For example, the scalar field is represented by $s(x, y, z)$. In another example, the value of the scalar field corresponding to the new vertex is represented by $s_n$, which is equal to the value of s at $(x_n, y_n, z_n)$.

Figure 4:
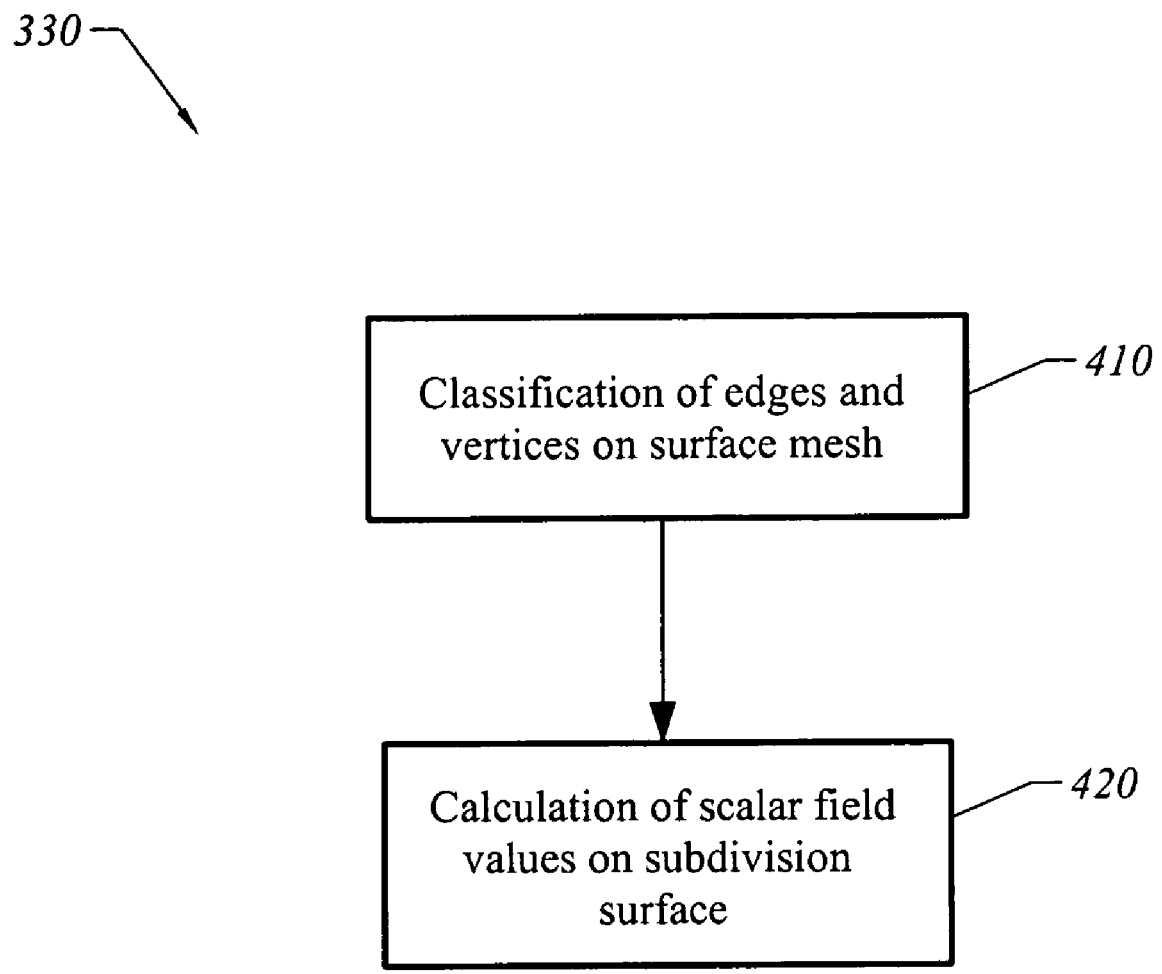
FIG. 4 is a simplified process for determining scalar field values for vertices according to an embodiment of the present invention.

FIG. 4 is a simplified process 330 for determining scalar field values for vertices according to an embodiment of the present invention. This diagram is merely an example, which should not unduly limit the scope of the claims. One of ordinary skill in the art would recognize many variations, alternatives, and modifications. The process 330 includes a process 410 for classification of edges and vertices on surface mesh, and a process 420 for calculation of scalar field values on subdivision surface. Although the above has been shown using a selected sequence of processes, there can be many alternatives, modifications, and variations. For example, some of the processes may be expanded and/or combined. Other processes may be inserted to those noted above. Depending upon the embodiment, the specific sequences of processes may be interchanged with others replaced. Further details of these processes are found throughout the present specification and more particularly below.

At the process 410, edges and vertices are classified on the surface mesh. For example, the surface mesh provided at the process 310 includes edges and vertices. In another example, an edge is classified into a face-varying boundary or a non-face-varying boundary. A vertex is classified by the number of face-varying boundaries that are incident on the vertex.

In one embodiment, an edge on the surface mesh is adjacent to two faces and includes two vertices. Each of the two vertices has a geometric location. For example, the geometric location is represented by coordinates $(x_0, y_0, z_0)$ in a three-dimensional Cartesian coordinate system. The coordinate system includes three axes x, y, and z. The geometric location of each vertex corresponds to at least a value for the scalar field. For example, the scalar field is represented by $s(x, y, z)$ as a scalar function of x, y, and z. If any of the two vertices corresponds to two different scalar field values in the two faces, the edge is determined to be a face-varying boundary. In another embodiment, if the edge represents a crease in the geometric space or the object space, the edge is also determined to be a face-varying boundary. In yet another embodiment, if the user specifies the edge as a face-varying boundary, the edge is also determined to be a face-varying boundary. If the edge is not determined to be a face-varying boundary, the edge is determined to be a non-face-varying boundary. For example, a non-face-varying boundary includes two vertices, each of which corresponds to the same scalar field value in the two faces.

Figure 5:
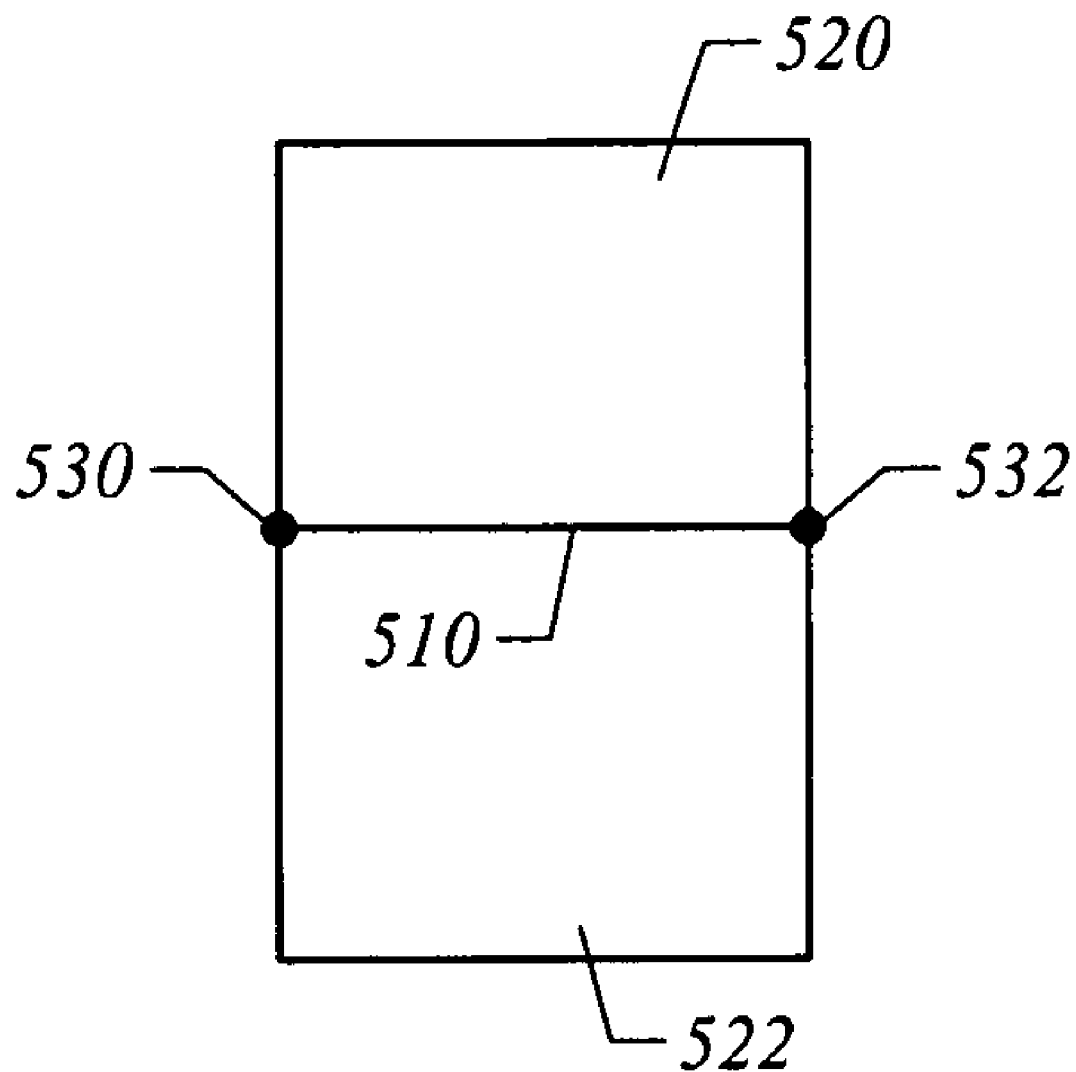
FIG. 5 is a simplified diagram for edge classification according to an embodiment of the present invention.

FIG. 5 is a simplified diagram for edge classification according to an embodiment of the present invention. This diagram is merely an example, which should not unduly limit the scope of the claims. One of ordinary skill in the art would recognize many variations, alternatives, and modifications. As shown in FIG. 5, an edge 510 on the surface mesh is adjacent to two faces 520 and 522 and includes two vertices 530 and 532. For example, the vertex 530 has a geometric location $(x_a, y_a, z_a)$. The geometric location corresponds to $s_1$ for the face 520 and $s_2$ for the face 522. $s_1$ and $s_2$ are values of the scalar field $s(x, y, z)$. Additionally, the vertex 530 has a geometric location $(x_b, y_b, z_b)$. The geometric location corresponds to $s_3$ for the face 520 and $s_4$ for the face 522. $s_1$, $s_2$, $s_3$ and $s_4$ are values of the scalar field $s(x, y, z)$.

In one embodiment, if $s_1$ is different from $s_2$ and the difference falls outside a predetermined range, the edge is determined as a face-varying boundary. If $s_3$ is different from $s_4$ and the difference falls outside a predetermined range, the edge is determined as a face-varying boundary. In another embodiment, if the edge 510 represents a crease in the geometric coordinate system (x, y, z), the edge 510 is also determined to be a face-varying boundary. In yet another embodiment, if the user specifies the edge 510 as a face-varying boundary, the edge is also determined to be a face-varying boundary. If the edge 510 is not determined to be a face-varying boundary, the edge is determined to be a non-face-varying boundary. For example, $s_1$ is equal to $s_2$, or $s_1$ is different from $s_2$ but the difference falls within a predetermined range. And $s_3$ is equal to $s_4$, or $s_3$ is different from $s_4$ but the difference falls within the predetermined range.

Figure 6:
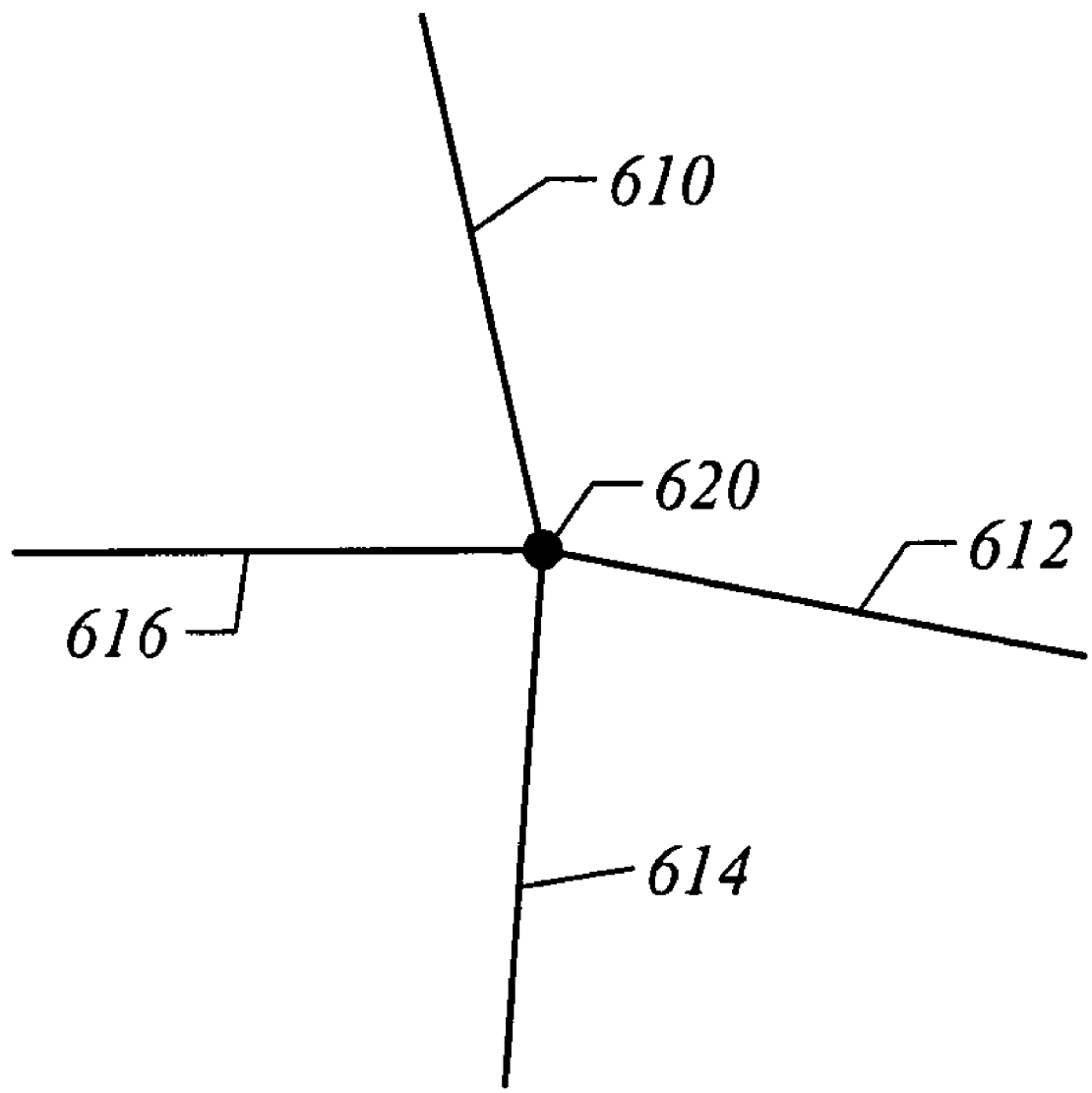
FIG. 6 is a simplified diagram for vertex classification according to an embodiment of the present invention.

Also at the process 410, a vertex is classified by a face-varying mask of the vertex. For example, a face-varying mask of a vertex is defined as the number of face-varying boundaries that are incident on the vertex. FIG. 6 is a simplified diagram for vertex classification according to an embodiment of the present invention. This diagram is merely an example, which should not unduly limit the scope of the claims. One of ordinary skill in the art would recognize many variations, alternatives, and modifications. As shown in FIG. 6, a vertex 620 has four edges that are incident on the vertex 620. These edges include edges 610, 612, 614 and 616. If N of these four edges are face-varying boundaries, the face-varying mask of the vertex 620 equals N. N is an integer larger than or equal to zero, and smaller than or equal to four. In another embodiment, the vertex 620 has M edges that are incident on the vertex 620. M is a positive integer. If N of these M edges are face-varying boundaries, the face-varying mask of the vertex 620 equals N. N is an integer larger than or equal to zero, and smaller than or equal to M.

At the process 420, the scalar field values are calculated for vertices on the subdivision surface. As discussed earlier, the surface mesh is processed to form a subdivision surface. The subdivision surface includes vertices whose geometric locations are determined at the process 320. For example, the vertices on the subdivision surface include face points, edge points, and vertex points. These vertices correspond to scalar field values that are to be determined at the process 420.

For a face point, its corresponding scalar field value is determined by the rule that is used to determine the geometric location of the face point. In one embodiment, the Catmull-Clark subdivision face-to-vertex rule is used. The scalar field value for the face point on the subdivision surface is equal to the average of the scalar field values corresponding to all the original points determining the face on the surface mesh. For each original point, its scalar field value for the face is used for the calculation, even if the original point has a different scalar field value for another face. In another embodiment, another standard subdivision face-to-vertex rule is used. For example, the standard subdivision face-to-vertex rule is related to the Loop subdivision.

Figure 7:
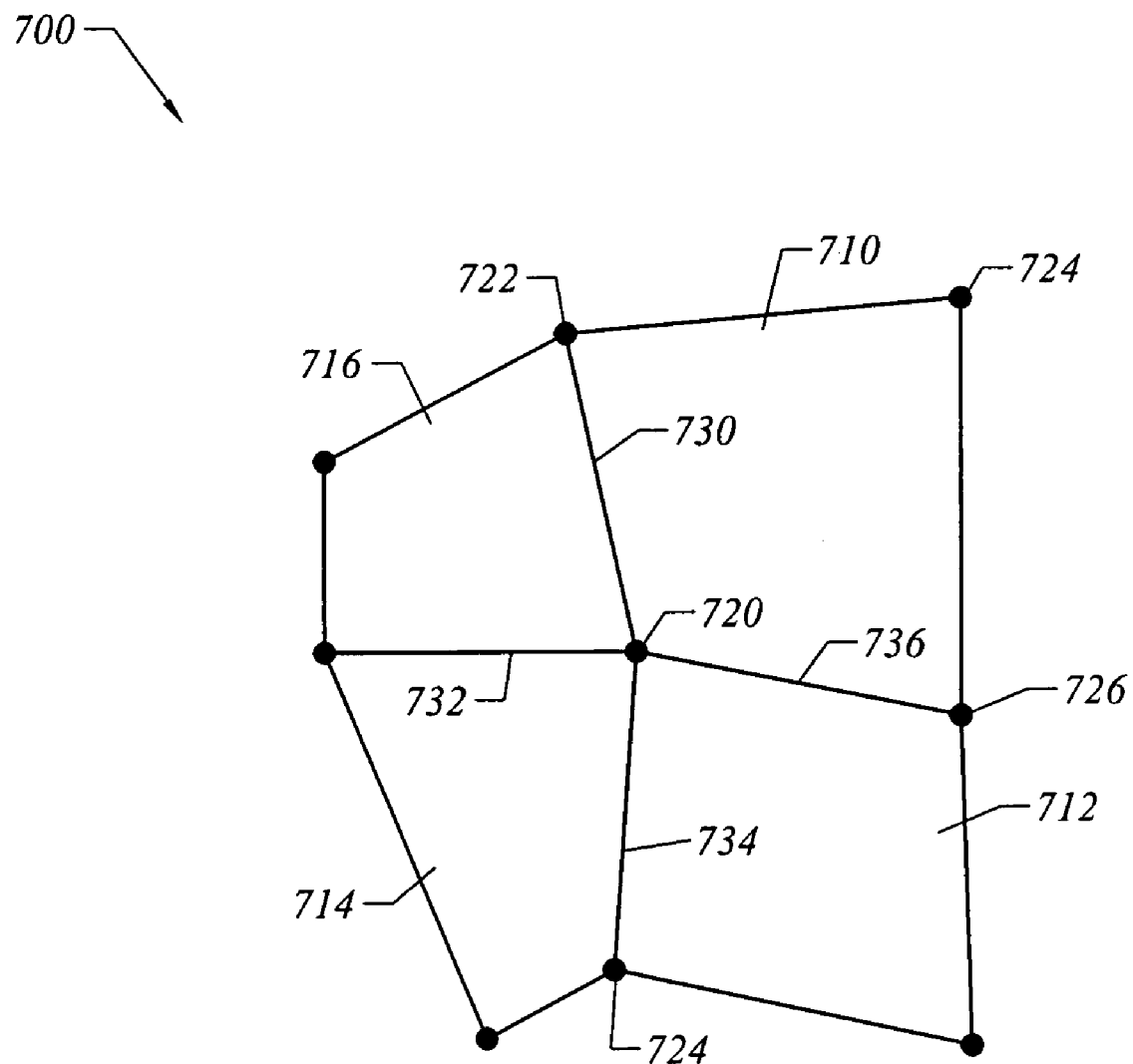
FIG. 7 is a simplified diagram for determining scalar field values with Catmull-Clark subdivision rules according to an embodiment of the present invention.

FIG. 7 is a simplified diagram for determining scalar field values with Catmull-Clark subdivision rules according to an embodiment of the present invention. This diagram is merely an example, which should not unduly limit the scope of the claims. One of ordinary skill in the art would recognize many variations, alternatives, and modifications. As shown, a surface mesh 700 includes faces 710, 712, 714, and 716. For example, the faces 710, 712, 714, and 716 are not in the same plane. In another example, the face 710 is determined by vertices 720, 722, 724, and 726. At the process 320, the surface mesh 700 is processed to generate a subdivision surface. The subdivision surface includes a face point corresponding to the face 710. The scalar field value of the face point is equal to the average of the scalar field values corresponding to the vertices 720, 722, 724, and 726. For each of the vertices 720, 722, 724, and 726, its scalar field value for the face 710 is used for the calculation. For example, if the point 726 corresponds to the scalar field value $s_1$ for the face 710 and $s_2$ for the face 712, the scalar field value $s_1$ is used for determining the scalar field value of the face point correspond to the face 710.

For an edge point, its corresponding scalar field value depends on whether the original edge corresponding to the edge point is a face-varying boundary or not. If the original edge on the surface mesh is not a face-varying boundary, the scalar field value for the edge point is determined by the rule that is used to determine the geometric location of the edge point. In one embodiment, the Catmull-Clark subdivision edge-to-vertex rule is used. The scalar field value for the edge point on the subdivision surface is equal to the average of the scalar field values corresponding to the original points determining the original edge and the scalar field values corresponding to the face points on the subdivision surface. The face points correspond to the original faces adjacent to the original edge. In another embodiment, another standard subdivision edge-to-vertex rule is used. For example, the standard subdivision edge-to-vertex rule is related to the Loop subdivision.

If the original edge on the surface mesh is a face-varying boundary, the scalar field value for the edge point is determined by the rule for boundary edges. In one embodiment, the Catmull-Clark subdivision boundary edge to vertex rule is used. For example, the scalar field value for the edge point on the subdivision surface is equal to the average of the scalar field values corresponding to the original points that determine the original edge. In one embodiment, the original edge is adjacent to at least two original faces. For any of these original faces, the determination of the scalar field value corresponding to the edge point uses the scalar field values of the original points for the same original face. This original face on the surface mesh can be divided into some sub-faces of the subdivision surface. For the sub-face adjacent to the edge point, the edge point is associated with the scalar field value calculated based on the scalar field values for the original face.

As shown in FIG. 7, the surface mesh 700 includes an edge 730. The edge 730 is incident on the two vertices 720 and 722, and adjacent to the faces 710 and 716. At the process 320, the surface mesh 700 is processed to generate the subdivision surface. The subdivision surface includes an edge point corresponding to the edge 730. For the edge point, its corresponding scalar field value depends on whether the edge 730 is a face-varying boundary or not. If the edge 730 is not a face-varying boundary, the scalar field value for the edge point is equal to the average of the scalar field values corresponding to the vertices 720 and 722 and the scalar field values corresponding to two face points on the subdivision surface. The two face points correspond to the faces 710 and 716 respectively. In one embodiment, the scalar field values related to the vertex 720 is different for the face 710 and 716, but the difference falls within a predetermined range. Either of the scalar field values can be used for calculating the scalar field value of the edge point. In another embodiment, the scalar field values related to the vertex 722 is different for the face 710 and 716, but the difference falls within a predetermined range. Either of the scalar field values can be used for calculating the scalar field value of the edge point.

If the edge 730 is a face-varying boundary, the scalar field value for the edge point is equal to the average of the scalar field values corresponding to the vertices 720 and 722. The edge 730 is adjacent to the faces 710 and 716. For the face 710, the determination of the scalar field value corresponding to the edge point uses the scalar field values of the vertices 720 and 722 for the face 710. The face 710 on the surface mesh can be divided into some sub-faces of the subdivision surface. For the sub-face adjacent to the edge point, the edge point is associated with the scalar field value calculated based on the scalar field values for the face 710. For the face 716, the determination of the scalar field value for the edge point uses the scalar field values of the vertices 720 and 722 for the face 716. The face 716 on the surface mesh can be divided into some sub-faces of the subdivision surface. For the sub-face adjacent to the edge point, the edge point is associated with the scalar field value calculated based on the scalar field values for the face 716.

For a vertex point, its corresponding scalar field value depends on the number of face-varying original boundaries that are incident on the original vertex that corresponds to the vertex point. The number of face-varying boundaries that are incident on the vertex is also called the face-varying mask of the original vertex.

If the face-varying mask of the original vertex is equal to zero or one, the scalar field value for the vertex point is determined by a subdivision rule for vertex with face-varying mask equal to zero or one. In one embodiment, the Catmull-Clark subdivision smooth vertex rule is used. The scalar field value for the vertex point on the subdivision surface is determined by the weighted average as shown below.

$$s_{vp} = \frac{n-2}{n}s_v + \frac{1}{n^2}\Sigma s_{ep} + \frac{1}{n^2}\Sigma s_{fp} \quad \text{(Equation 1)}$$

where $s_{vp}$ represents the scalar field value for the vertex point. $s_v$ represents the scalar field value for the original vertex on the surface mesh that corresponds to the vertex point on the subdivision surface. $s_{ep}$ represents the scalar field value for an edge point corresponding to an original edge that is incident on the vertex on the surface mesh, and $\Sigma s_{ep}$ represents a sum of the scalar field values for all edge points, each of which corresponds to an original edge that is incident on the original vertex on the surface mesh. $s_{fp}$ represents the scalar field value for a face point corresponding to an original face that is adjacent to the vertex on the surface mesh, and $\Sigma s_{fp}$ represents a sum of the scalar field values for all face points, each of which corresponds to an original face that is adjacent to the original vertex on the surface mesh. Additionally, n represents the number of original edges incident on the original vertex. For example, n is called valence of the original vertex.

If the face-varying mask of the original vertex equals one, the scalar field value $s_{vp}$ for the vertex point depends on which face adjacent to the original vertex is under consideration. If the face under consideration is adjacent to the face-varying original boundary, the scalar field value $s_{ep}$ corresponding to the face-varying original boundary used in Equation 1 is the scalar field value $s_{ep}$ for the face under consideration. If the face under consideration is not adjacent to the face-varying original boundary, the scalar field value $s_{ep}$ corresponding to the face-varying original boundary used in Equation 1 is the scalar field value $s_{ep}$ for a first original face that is adjacent to the face-varying original boundary. In one embodiment, the face-varying original boundary is also adjacent to at least a second original face. The original face under consideration is equal distant or closer to the first original face than to the second original face. For example, the original face under consideration is separated from the first original face by an equal or fewer number of original faces than from the second original face.

Additionally, the original face under consideration is divided into some sub-faces of the subdivision surface. For a sub-face adjacent to the vertex point, the vertex point is associated with the scalar field value that is already calculated according to Equation 1 as discussed above.

As shown in FIG. 7, the surface mesh 700 includes a vertex 720 and the edges 730, 732, 734 and 736. These edges are incident on the vertex 720. The vertex 720 on the surface mesh 700 corresponds to a vertex point on the subdivision surface. The scalar field value for the vertex point depends on face-varying mask of the vertex 720 equal to the number of face-varying boundaries among the edges 730, 732, 734 and 736.

If the face-varying mask of the vertex 720 is equal to zero or one, the scalar field value for the vertex point is determined according to Equation 1. $s_{vp}$ represents the scalar field value for the vertex point. $s_v$ represents the scalar field value for the vertex 720. $\Sigma s_{ep}$ represents a sum of the scalar field values for all edge points corresponding to the edges 730, 732, 734, and 736 respectively. $\Sigma s_{fp}$ represents a sum of the scalar field values for all edge points that correspond to the faces 710, 712, 714, and 716 adjacent to the vertex 720. Additionally, the valence n is equal to four.

If the face-varying mask of the vertex 720 equals one, the scalar field value $s_{vp}$ for the vertex point depends on which face adjacent to the vertex 720 is under consideration. For example, the edge 730 is a face-varying boundary. In one embodiment, the face under consideration is the face 710. The scalar field value $s_{ep}$ corresponding to the edge 730 for the face 710 is used in Equation 1. The face 710 is divided into some sub-faces of the subdivision surface. For a sub-face adjacent to the vertex point, the vertex point is associated with the scalar field value that is calculated according to Equation 1.

In another example, the face 712 is under consideration. The scalar field value $s_{ep}$ corresponding to the edge 730 for the face 710 is used for Equation 1. As shown in FIG. 7, both faces 710 and 716 are adjacent to the face-varying boundary 730. The face 710 is closer to the face 712 than the face 716 to the face 712. The face 712 is adjacent to the face 710, but the face 712 is separated from the face 716 by the face 714. Additionally, the face 712 is divided into some sub-faces of the subdivision surface. For a sub-face adjacent to the vertex point, the vertex point is associated with the scalar field value that is calculated according to Equation 1.

If the face-varying mask of the original vertex equals three or more, the scalar field value for the vertex point is determined by a subdivision rule for vertex with face-varying mask equal to three or more. In one embodiment, the Catmull-Clark subdivision corner rule is used. For each face adjacent to the original vertex, the scalar field value of the vertex point is equal to the scalar field value of the original vertex for the same face. Additionally, the face can be divided into some sub-faces of the subdivision surface. For a sub-face adjacent to the vertex point, the vertex point is associated with the scalar field value calculated based on the scalar field values for the original face.

If the face-varying mask of the original vertex is equal to two, the scalar field value for the vertex point depends on the geometric locations of the two face-varying boundaries incident on the original vertex. In one embodiment, the two face-varying boundaries are not adjacent to a same face. A face adjacent to the original vertex is under consideration. For example, for the face under consideration, the scalar field associated with the vertex point is determined by the Catmull-Clark subdivision boundary vertex rule. In another example, for the face under consideration, the scalar field associated with the vertex point is equal to a weighted average as shown below.

$$s_{vp} = \frac{3}{4}s_v + \frac{1}{8}s_{ova} + \frac{1}{8}s_{ovb} \qquad \text{(Equation 2)}$$

wherein $s_{vp}$ is the scalar field value of the vertex point. $s_v$ is the scalar field value of the original vertex. $s_{ova}$ and $s_{ovb}$ are the scalar field values corresponding to the other two original vertices that, with the original vertex, determine the two face-varying boundaries.

For example, the face under consideration is adjacent to a first face-varying boundary but not a second face-varying boundary. The first face-varying boundary is determined by the original vertex and a first vertex on the surface mesh, and the second face-varying boundary is determined by the original vertex and a second vertex on the surface mesh. The second face-varying boundary is adjacent to a first face and a second face. For the face under consideration, the scalar field associated with the vertex point is equal to the average of the scalar field value corresponding to the first vertex for the face under consideration and the scalar field value corresponding to the second vertex for a selected face. The selected face is the first face or the second face that is not separated from the face under consideration by a face-varying boundary.

Additionally, the original face under consideration is divided into some sub-faces of the subdivision surface. For the sub-face adjacent to the vertex point, the vertex point is associated with the scalar field value already calculated as discussed above.

As shown in FIG. 7, the surface mesh includes the vertex 720 and the edges 730, 732, 734 and 736. These edges are incident on the vertex 720. Among the four edges, only the edges 730 and 734 are face-varying boundaries. The edge 730 is determined by the vertices 720 and 722, and the edge 734 is determined by the vertex 720 and a vertex 724. Additionally, the vertex 720 is adjacent to the faces 710, 712, 714, and 716.

In one embodiment, the face 712 is under consideration. For the face 712, the scalar field associated with the vertex point is equal to the weighted average according to Equation 2. The weighted average is performed based on the scalar field value corresponding to the vertex 722 for the face 710 and the scalar field values corresponding to the vertices 720 and 724 for the face 712. For example, the scalar field values associated with the vertex 722 for the faces 716 and 710 are either equal or different. In another example, the scalar field values associated with the vertex 724 for the faces 714 and 712 are either equal or different. Additionally, the face 712 on the surface mesh 700 is divided into some sub-faces of the subdivision surface. For a sub-face adjacent to the vertex point, the vertex point is associated with the scalar field value calculated as discussed above.

As discussed above, if the face-varying mask of the original vertex is equal to two, the scalar field value for the vertex point depends on the geometric locations of the two face-varying boundaries incident on the original vertex. In another embodiment, the two face-varying boundaries are adjacent to a same face. For example, the face adjacent to both face-varying boundaries is under consideration. The scalar field value for the vertex point is determined in the same way as one for the face-varying mask of the original vertex being equal to three or more. For example, using the Catmull-Clark subdivision rule, for this face under consideration, the scalar field value of the vertex point is equal to the scalar field value of the original vertex for the same face. Additionally, the face under consideration can be divided into some sub-faces of the subdivision surface. For a sub-face adjacent to the vertex point, the vertex point is associated with the scalar field value calculated based on the scalar field value for the face under consideration.

In another example, a face under consideration is adjacent to only one or neither of the two face-varying boundaries incident on the original vertex. The two face-varying boundaries are both adjacent to another face. In one embodiment, for the face under consideration, the scalar field value for the vertex point is determined in the same way as one for the face-varying mask of the original vertex being equal to zero or one. In another example, for the face under consideration, the scalar field value for the vertex point is determined in the same way as one for the face-varying mask of the original vertex being equal to two and for the two face-varying boundaries not being adjacent to a same face. In yet another embodiment, for the face under consideration, the scalar field value for the vertex point is determined in the same way as one for the face-varying mask of the original vertex being equal to three.

As discussed above and further emphasized here, FIGS. 4-7 are merely examples, which should not unduly limit the scope of the claims. One of ordinary skill in the art would recognize many variations, alternatives, and modifications. For example, the processes 420 is used to determine the scalar field values for various vertices on the subdivision surface. For each of these vertices, its scalar field values are determined for multiple faces adjacent to the vertex on the subdivision surface.

Returning to FIG. 3, at the process 340, the need for an additional subdivision is determined. If the additional subdivision is needed, the processes 320, 330, and 340 are repeated. In one embodiment, the process 330 includes the processes 410 and 420. In another embodiment, the process 410 is replaced by an alternative process. The alternative process is used to classify the edges and vertices on the surface mesh based on at least characteristics of the edges and vertices on the parent surface. The edges and vertices on the surface mesh are generated by subdividing the parent surface.

As discussed above and further emphasized here, FIGS. 3-7 are merely examples, which should not unduly limit the scope of the claims. One of ordinary skill in the art would recognize many variations, alternatives, and modifications. For example, the processes 320 and 330 can be performed sequentially and/or simultaneously. For each vertex on the subdivision surface, its geometric location can be determined before, after, or at the same time as its associated scalar field value is determined. In another example, the processes 420 and 430 can be performed sequentially and/or simultaneously. The scalar field value for a vertex on the subdivision surface can be determined before, after, or at the same time as some edges and/or vertices on the surface mesh are classified. In one embodiment, the scalar field value for a vertex on the subdivision surface is determined before or at the same time as some edges and/or vertices on the surface mesh are classified. These edges and/or vertices do not correspond to the vertex on the surface mesh.

According to yet another embodiment, a computer program product includes a computer-readable medium including instructions for determining a scalar field on a subdivision surface. The computer-readable medium includes one or more instructions for performing some or all processes as shown in FIGS. 3-7.

According to yet another embodiment, a computer program product includes a computer-readable medium including instructions for determining a scalar field on a subdivision surface. The computer-readable medium includes one or more instructions for providing a surface mesh including an edge. The edge connects a plurality of vertices and is adjacent to a plurality of faces. The plurality of vertices corresponds to a plurality of values for a scalar field. Additionally, the computer-readable medium includes one or more instructions for processing information associated with the surface mesh, and one or more instructions for determining a geometric location for an edge point on a subdivision surface based on at least information associated with the surface mesh. The edge point corresponds to the edge. Moreover, the computer-readable medium includes one or more instructions for determining whether the edge is a face-varying boundary based on at least information associated with the surface mesh, one or more instructions for processing information associated with whether the edge is a face-varying boundary, and one or more instructions for determining a first value for the scalar field corresponding to the edge point based on at least information associated with whether the edge is a face-varying boundary.

According to yet another embodiment, a computer program product includes a computer-readable medium including instructions for determining a scalar field on a subdivision surface. The computer-readable medium includes one or more instructions for providing a surface mesh including a first vertex connected to a plurality of vertices by a plurality of edges. The first vertex is adjacent to a plurality of faces and corresponds to a first value for a scalar field. Additionally, the computer-readable medium includes one or more instructions for processing information associated with the surface mesh, and one or more instructions for determining a geometric location for a vertex point on a subdivision surface based on at least information associated with the surface mesh. The vertex point corresponds to the first vertex. Moreover, the computer-readable medium includes one or more instructions for determining a face-varying mask for the first vertex based on at least information associated with the surface mesh, one or more instructions for processing information associated with the face-varying mask for the first vertex, and one or more instructions for determining a second value for the scalar field corresponding to the vertex point based on at least in formation associated with the face-varying mask for the first vertex.

According to yet another embodiment, a system for determining a scalar field on a subdivision surface includes a processing system. The processing system is configured to perform some or all processes as shown in FIGS. 3-7.

According to yet another embodiment, a system for determining a scalar field on a subdivision surface includes a processing system. The processing system is configured to provide a surface mesh including an edge. The edge connects a plurality of vertices and is adjacent to a plurality of faces. The plurality of vertices corresponds to a plurality of values for a scalar field. Additionally, the processing system is configured to process information associated with the surface mesh, and determine a geometric location for an edge point on a subdivision surface based on at least information associated with the surface mesh. The edge point corresponds to the edge. Moreover, the processing system is configured to determine whether the edge is a face-varying boundary based on at least information associated with the surface mesh, process information associated with whether the edge is a face-varying boundary, and determine a first value for the scalar field corresponding to the edge point based on at least information associated with whether the edge is a face-varying boundary.

According to yet another embodiment, a system for determining a scalar field on a subdivision surface includes a processing system. The processing system is configured to provide a surface mesh including a first vertex connected to a plurality of vertices by a plurality of edges. The first vertex is adjacent to a plurality of faces and corresponds to a first value for a scalar field. Additionally, the processing system is configured to process information associated with the surface mesh, and determine a geometric location for a vertex point on a subdivision surface based on at least information associated with the surface mesh. The vertex point corresponds to the first vertex. Moreover, the processing system is configured to determine a face-varying mask for the first vertex based on at least information associated with the surface mesh, process information associated with the face-varying mask for the first vertex, and determine a second value for the scalar field corresponding to the vertex point based on at least in formation associated with the face-varying mask for the first vertex.

The present invention has various applications. For example, some embodiments of the present invention can be used to map textures onto subdivision surfaces by smooth and disjoint interpolations of scalar fields. For example, the scalar fields represent the mapping between coordinates in the texture space and coordinates in the object space. The coordinates in the object space also correspond to two-dimensional coordinates on the image screen. The subdivision surfaces mapping textures can be projected onto the image plane to form an image.

The present invention has various advantages. Some embodiments of the present invention provide interpolations of a disjoint and smooth scalar field on subdivision surfaces. For example, the interpolations can preserve desired discontinuities and continuities for the scalar field. Certain embodiments of the present invention perform edge and vertex classifications for each scalar field. Based on classifications, interpolations of the scalar field can performed under various rules. Some embodiments of the present invention analyze and interpolate each scalar field independently. Desired discontinuities for the scalar field can be preserved without affecting other scalar fields on the subdivision surfaces. For example, creases and corners can be specified by the user for a scalar field without affecting other scalar fields or the geometry. Certain embodiments of the present invention can provide desired smooth interpolations and eliminate or reduce "kinks" near extraordinary vertices. Some embodiments of the present invention use hybrid interpolations of a scalar field.

Figure 8:
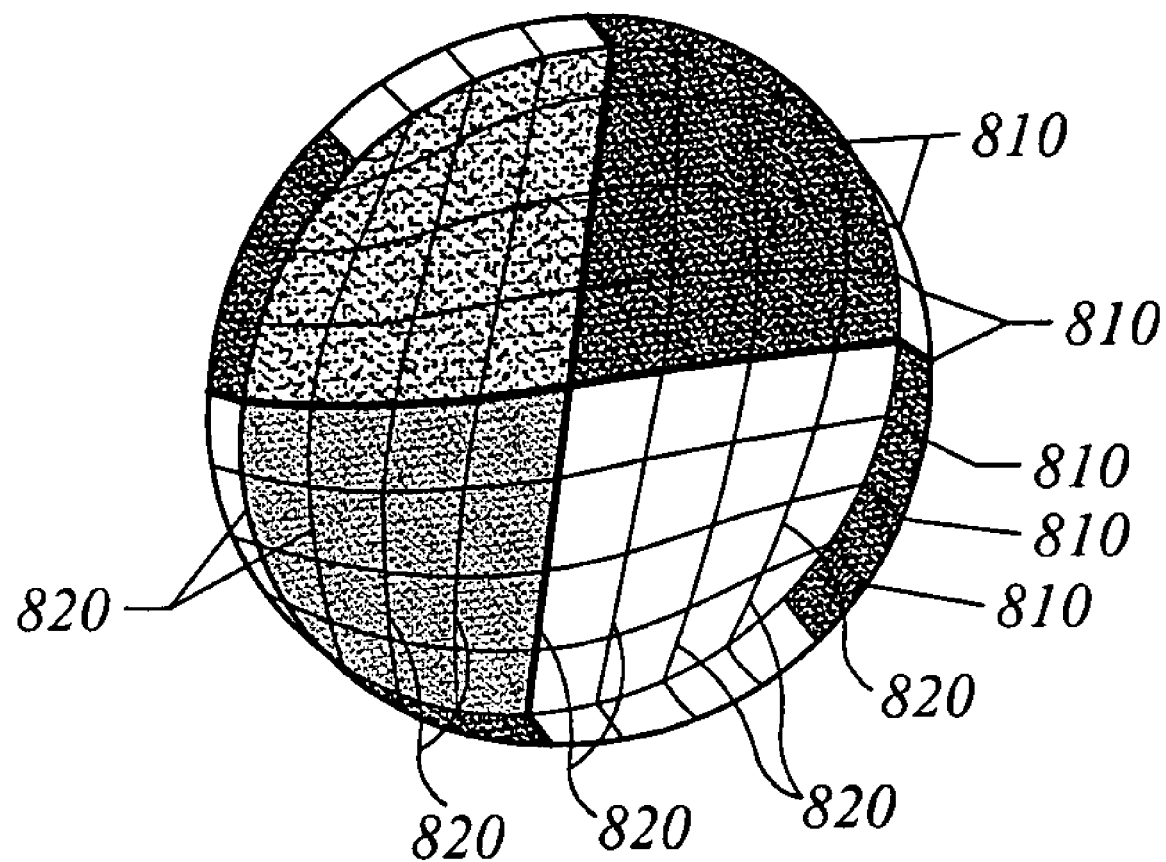
FIG. 8 shows a color texture image wrapped around a subdivision surface according to an embodiment of the present invention.

FIG. 8 shows a color texture image wrapped around a subdivision surface according to an embodiment of the present invention. This diagram is merely an example, which should not unduly limit the scope of the claims. One of ordinary skill in the art would recognize many variations, alternatives, and modifications. The subdivision surface is generated from a polygonal mesh cube, and is wrapped around by a color texture image. The color texture image includes grid lines 810 and grid lines 820. Before being wrapped around the subdivision surface, the grid lines 810 are straight and parallel to an axis for a texture coordinate, and the grid lines 820 are also straight and parallel to another axis for another texture coordinate. As shown in FIG. 8, after the texture coordinates are mapped with geometric coordinates of the subdivision surface, the grid lines 810 and 820 do not include any "kinks" near extraordinary vertices.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method for determining a scalar field on a subdivision surface, the method comprising:
   providing a surface mesh including an edge, the edge connecting a plurality of vertices, the edge adjacent to a plurality of faces, the plurality of vertices corresponding to a plurality of values for a scalar field;
   processing information associated with the surface mesh using a processor;
   determining a geometric location for an edge point on a subdivision surface based on at least information associated with the surface mesh, the edge point corresponding to the edge;
   determining whether the edge is a face-varying boundary based on at least information associated with the surface mesh;
   processing information associated with whether the edge is a face-varying boundary;
   computing a first value from the surface mesh for the scalar field corresponding to the edge point based on at least information associated with whether the edge is a face-varying boundary;
   wherein
   the plurality of vertices includes a first vertex and a second vertex;
   the plurality of faces includes a first face and a second face;
   the plurality of values includes a second value, a third value, a fourth value, and a fifth value;
   the first vertex corresponds to the second value for the first face and the third value for the second face;
   the second vertex corresponds to the fourth value for the first face and the fifth value for the second face;
   the subdivision surface includes a first face point and a second face point;
   the first face point corresponds to the first face;
   the second face point corresponds to the second face;
   the first face point is associated with a sixth value for the scalar field;
   the second face point is associated with a seventh value for the scalar field;
   The determining a first value for the scalar field corresponding to the edge point comprises if the edge is a face-varying boundary, the first value is equal to an average of the second value and the fourth value or an average of the third value and the fifth value.

2. The method of claim 1 wherein:
   the subdivision surface includes a first plurality of sub-faces and a second plurality of sub-faces;
   the first plurality of sub-faces corresponds to the first face;
   the second plurality of sub-faces corresponds to the second face;
   the first plurality of sub-faces includes a first sub-face adjacent to the edge point;
   the second plurality of sub-faces includes a second sub-face adjacent to the edge point.

3. The method of claim 2 wherein:
   for the first sub-face, the first value is equal to an average of the second value and the fourth value;
   for the second sub-face, the first value is equal to an average of the third value and the fifth value.

4. A method for determining a scalar field on a subdivision surface, the method comprising:
   providing a surface mesh including a first vertex connected to a plurality of vertices by a plurality of edges, the first vertex adjacent to a plurality of faces and corresponding to a first value for a scalar field;
   processing information associated with the surface mesh using a processor;
   determining a geometric location for a vertex point on a subdivision surface based on at least information associated with the surface mesh, the vertex point corresponding to the first vertex;
   determining a face-varying mask for the first vertex based on at least information associated with the surface mesh;
   processing information associated with the face-varying mask for the first vertex;
   determining a second value for the scalar field corresponding to the vertex point based on at least information associated with the face-varying mask for the first vertex.

5. The method of claim 4 wherein the determining a face-varying mask for the first vertex includes determining the face-varying mask to be equal to zero or one.

6. The method of claim 5 wherein:
   if the face-varying mask for the first vertex is equal to one, the plurality of edges includes a first edge, the first edge being a face-varying boundary;
   if the face-varying mask for the first vertex is equal to zero, none of the plurality of edges is a face-varying boundary.

7. The method of claim 6 wherein:
   the plurality of edges corresponds to a plurality of edge points on the subdivision surface, the plurality of edge points being related to a first plurality of values for the scalar field;
   the plurality of faces corresponds to a plurality of face points on the subdivision surface, the plurality of face points being related to a second plurality of values for the scalar field.

8. The method of claim 7 wherein the determining a second value for the scalar field corresponding to the vertex point comprises determining the second value to be equal to a weighted average of the first value, the first plurality of values, and the second plurality of values.

9. The method of claim 8 wherein:
   the first plurality of values includes a third value;
   the plurality of faces includes a first face and a second face;
   the third value for the first face is different from the third value for the second face.

10. The method of claim 4 wherein the determining a face-varying mask for the first vertex includes determining the face-varying mask to be equal to two.

11. The method of claim 10 wherein:
    the plurality of edges includes a first edge and a second edge, the first edge and the second edge each being a face-varying boundary;
    the plurality of vertices includes a second vertex and a third vertex;
    the first edge connects the first vertex and the second vertex;
    the second edge connects the first vertex and the third vertex;
    the second vertex corresponds to a third value for the scalar field;
    the third vertex corresponds to a fourth value for the scalar field.

12. The method of claim 11 wherein the processing information associated with the face-varying mask for the first vertex comprises:
processing information associated with the first edge and the second edge;
determining whether the first edge and the second edge are adjacent to a same face, the same face being one of the plurality of faces.

13. The method of claim 12 wherein the determining a second value for the scalar field corresponding to the vertex point comprises if the first edge and the second edge are not adjacent to the same face, the second value is equal to a weighted average of the first value, the third value and the fourth value.

14. The method of claim 13 wherein:
the plurality of faces includes a first face and a second face;
the first edge is adjacent to the first face and the second face;
the third value for the first face is different from the third value for the second face.

15. The method of claim 12 wherein:
the processing information associated with the face-varying mask for the first vertex includes determining the first edge and the second edge to be adjacent to the same face;
the plurality of faces includes a first face, the first face being the same face.

16. The method of claim 15 wherein:
the subdivision surface includes a first plurality of sub-faces corresponding to the first face;
the first plurality of sub-faces includes a first sub-face adjacent to the vertex point.

17. The method of claim 16 wherein the determining a second value for the scalar field corresponding to the vertex point comprises for the first sub-face, the second value is equal to the first value for the first face.

18. The method of claim 4 wherein the determining a face-varying mask for the first vertex includes determining the face-varying mask to be equal to three or more.

19. The method of claim 18 wherein:
the plurality of faces includes a first face;
the subdivision surface includes a first plurality of sub-faces corresponding to the first face;
the first plurality of sub-faces includes a first sub-face adjacent to the vertex point.

20. The method of claim 19 wherein the determining a second value for the scalar field corresponding to the vertex point comprises for the first sub-face, the second value is equal to the first value for the first face.

21. The method of claim 4 further comprising forming an image.

22. A computer program product including a computer-readable medium including instructions for determining a scalar field on a subdivision surface, the computer-readable medium comprises:
one or more instructions for providing a surface mesh including a first vertex connected to a plurality of vertices by a plurality of edges, the first vertex adjacent to a plurality of faces and corresponding to a first value for a scalar field;
one or more instructions for processing information associated with the surface mesh;
one or more instructions for determining a geometric location for a vertex point on a subdivision surface based on at least information associated with the surface mesh, the vertex point corresponding to the first vertex;
one or more instructions for determining a face-varying mask for the first vertex based on at least information associated with the surface mesh;
one or more instructions for processing information associated with the face-varying mask for the first vertex;
one or more instructions for determining a second value for the scalar field corresponding to the vertex point based on at least in formation associated with the face-varying mask for the first vertex; and
a computer program for executing instructions.

23. A system for determining a scalar field on a subdivision surface, the system comprising:
a processing system configured to:
provide a surface mesh including a first vertex connected to a plurality of vertices by a plurality of edges, the first vertex adjacent to a plurality of faces and corresponding to a first value for a scalar field;
process information associated with the surface mesh;
determine a geometric location for a vertex point on a subdivision surface based on at least information associated with the surface mesh, the vertex point corresponding to the first vertex;
determine a face-varying mask for the first vertex based on at least information associated with the surface mesh;
process information associated with the face-varying mask for the first vertex;
determine a second value for the scalar field corresponding to the vertex point based on at least in formation associated with the face-varying mask for the first vertex.

24. The method of claim 1 wherein the determining a first value for the scalar field corresponding to the edge point comprises if the edge is not a face-varying boundary, the first value is equal to an average of the second value or the third value, the fourth value or the fifth value, the sixth value, and the seventh value.

* * * * *